US009482057B2

United States Patent
DiGiovanni et al.

(10) Patent No.: US 9,482,057 B2
(45) Date of Patent: Nov. 1, 2016

(54) CUTTING ELEMENTS FOR EARTH-BORING TOOLS, EARTH-BORING TOOLS INCLUDING SUCH CUTTING ELEMENTS AND RELATED METHODS

(75) Inventors: Anthony A. DiGiovanni, Houston, TX (US); Rudolf Carl Pessier, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 728 days.

(21) Appl. No.: 13/472,377

(22) Filed: May 15, 2012

(65) Prior Publication Data

US 2013/0068534 A1    Mar. 21, 2013

Related U.S. Application Data

(60) Provisional application No. 61/535,766, filed on Sep. 16, 2011.

(51) Int. Cl.

| E21B 10/55 | (2006.01) |
|---|---|
| E21B 10/567 | (2006.01) |
| E21B 10/573 | (2006.01) |
| E21B 7/00 | (2006.01) |
| B23P 15/28 | (2006.01) |
| B22F 5/00 | (2006.01) |

(52) U.S. Cl.
CPC .............. *E21B 10/55* (2013.01); *E21B 7/00* (2013.01); *E21B 10/5673* (2013.01); *B22F 2005/001* (2013.01); *B23P 15/28* (2013.01); *Y10T 29/49* (2015.01)

(58) Field of Classification Search
CPC .................... E21B 10/5673; E21B 10/5676
See application file for complete search history.

(56) References Cited

U.S. PATENT DOCUMENTS

| 4,224,380 A | 9/1980 | Bovenkerk et al. |
| 4,538,690 A | 9/1985 | Short |
| 4,539,018 A | 9/1985 | Whanger |
| 4,558,753 A | 12/1985 | Barr |
| 4,593,777 A | 6/1986 | Barr |
| 4,629,373 A | 12/1986 | Hall |
| 4,858,707 A | 8/1989 | Jones et al. |
| 4,872,520 A | 10/1989 | Nelson |
| 4,984,642 A | 1/1991 | Renard |
| 4,997,049 A | 3/1991 | Tank |
| 5,007,207 A | 4/1991 | Phaal et al. |

(Continued)

FOREIGN PATENT DOCUMENTS

| CN | 2278759 Y | 4/1998 |
| CN | 2579580 Y | 10/2003 |

(Continued)

OTHER PUBLICATIONS

DiGiovanni et al, U.S. Appl. No. 13/477,905 entitled, Cutting Elements for Earth-Boring Tools, EarthBoring Tools Including Such Cutting Elemeents, and Related Methods, filed May 22, 2012.

(Continued)

*Primary Examiner* — Robert E Fuller
(74) *Attorney, Agent, or Firm* — TraskBritt

(57) ABSTRACT

Cutting elements, earth-boring drill bits having such cutting elements and related methods include a cutting element having a superabrasive table positioned on a substrate, and at least one recessed surface in a cutting face of the superabrasive table.

11 Claims, 12 Drawing Sheets

(56) References Cited

U.S. PATENT DOCUMENTS

| | | | |
|---|---|---|---|
| 5,054,246 A | 10/1991 | Phaal et al. | |
| 5,078,219 A | 1/1992 | Morrell | |
| 5,127,923 A | 7/1992 | Bunting et al. | |
| 5,172,778 A * | 12/1992 | Tibbitts et al. | 175/420.1 |
| 5,333,699 A | 8/1994 | Thigpen | |
| 5,351,772 A | 10/1994 | Smith | |
| 5,355,969 A | 10/1994 | Hardy et al. | |
| 5,377,773 A | 1/1995 | Tibbitts | |
| 5,437,343 A | 8/1995 | Cooley et al. | |
| 5,447,208 A * | 9/1995 | Lund et al. | 175/428 |
| 5,449,048 A * | 9/1995 | Thigpen et al. | 175/430 |
| 5,533,582 A | 7/1996 | Tibbitts | |
| 5,549,171 A | 8/1996 | Mensa et al. | |
| 5,569,000 A | 10/1996 | Littecke et al. | |
| 5,607,024 A | 3/1997 | Keith | |
| 5,653,300 A | 8/1997 | Lund et al. | |
| 5,984,005 A | 11/1999 | Hart et al. | |
| 6,006,846 A | 12/1999 | Tibbitts et al. | |
| 6,045,440 A | 4/2000 | Johnson et al. | |
| 6,059,054 A | 5/2000 | Portwood et al. | |
| 6,065,554 A | 5/2000 | Taylor et al. | |
| 6,068,071 A | 5/2000 | Jurewicz et al. | |
| 6,145,608 A | 11/2000 | Lund et al. | |
| 6,164,394 A | 12/2000 | Mensa-Wilmot et al. | |
| 6,196,340 B1 | 3/2001 | Jensen et al. | |
| 6,196,910 B1 | 3/2001 | Johnson | |
| 6,202,770 B1 | 3/2001 | Jurewicz et al. | |
| 6,202,771 B1 | 3/2001 | Scott et al. | |
| 6,220,376 B1 | 4/2001 | Lundell | |
| 6,328,117 B1 | 12/2001 | Berzas et al. | |
| 6,524,363 B2 | 2/2003 | Gates, Jr. et al. | |
| 6,527,065 B1 | 3/2003 | Tibbitts et al. | |
| 6,550,556 B2 | 4/2003 | Middlemiss et al. | |
| 6,935,444 B2 | 8/2005 | Lund et al. | |
| 6,962,218 B2 | 11/2005 | Eyre | |
| 7,000,715 B2 | 2/2006 | Sinor et al. | |
| 7,363,992 B2 | 4/2008 | Stowe et al. | |
| 7,373,998 B2 | 5/2008 | Cariveau et al. | |
| 7,533,740 B2 | 5/2009 | Zhang et al. | |
| 7,740,090 B2 | 6/2010 | Shen et al. | |
| 7,861,808 B2 | 1/2011 | Zhang et al. | |
| 8,016,054 B2 | 9/2011 | Lancaster et al. | |
| 8,191,656 B2 | 6/2012 | Dourfaye | |
| 8,210,288 B2 | 7/2012 | Chen | |
| 8,684,112 B2 | 4/2014 | DiGiovanni et al. | |
| D712,941 S | 9/2014 | Mo | |
| 8,833,492 B2 | 9/2014 | Durairajan et al. | |
| 2004/0009376 A1 | 1/2004 | Wan et al. | |
| 2005/0247492 A1 | 11/2005 | Shen et al. | |
| 2005/0269139 A1 | 12/2005 | Shen et al. | |
| 2007/0235230 A1 | 10/2007 | Cuillier et al. | |
| 2008/0006448 A1 | 1/2008 | Zhang et al. | |
| 2008/0035380 A1 | 2/2008 | Hall et al. | |
| 2008/0264696 A1 | 10/2008 | Dourfaye et al. | |
| 2008/0308321 A1 | 12/2008 | Aliko | |
| 2009/0114628 A1 | 5/2009 | DiGiovanni | |
| 2009/0321146 A1 | 12/2009 | Dick et al. | |
| 2010/0084198 A1 | 4/2010 | Durairajan et al. | |
| 2010/0276200 A1 | 11/2010 | Schwefe et al. | |
| 2010/0307829 A1 * | 12/2010 | Patel | 175/57 |
| 2011/0000714 A1 * | 1/2011 | Durairajan | E21B 10/55 175/57 |
| 2011/0031030 A1 | 2/2011 | Shen et al. | |
| 2011/0171414 A1 | 7/2011 | Sreshta et al. | |
| 2011/0259642 A1 | 10/2011 | DiGiovanni et al. | |
| 2012/0205162 A1 | 8/2012 | Patel et al. | |
| 2013/0068534 A1 | 3/2013 | DiGiovanni et al. | |
| 2013/0068537 A1 | 3/2013 | DiGiovanni | |
| 2013/0068538 A1 | 3/2013 | DiGiovanni et al. | |
| 2013/0292188 A1 | 11/2013 | Bilen et al. | |
| 2014/0238753 A1 | 8/2014 | Nelms et al. | |
| 2014/0246253 A1 | 9/2014 | Patel et al. | |

FOREIGN PATENT DOCUMENTS

| | | |
|---|---|---|
| CN | 1714224 A | 12/2005 |
| CN | 201024900 Y | 2/2008 |
| CN | 201202408 Y | 3/2009 |
| EP | 546725 A1 | 9/1996 |
| EP | 0835981 A2 | 4/1998 |
| EP | 0979699 A1 | 8/1999 |
| WO | 9415058 A1 | 7/1994 |
| WO | 9427769 A1 | 12/1994 |
| WO | 0048789 A1 | 8/2000 |
| WO | 0160554 A1 | 8/2001 |
| WO | 2008006010 A3 | 1/2008 |

OTHER PUBLICATIONS

DiGiovanni, Provisional U.S. Appl. No. 61/535,772 entitled, Cutting Elements for Earth-Boring Tools, Earth-Boring Tools Including Such Cutting Elements and Related Methods, filed Sep. 16, 2011.
Guilin Color Engineered Diamond Technology (EDT) Co. Ltd., Brochure, Offshore Technology Conference Apr. 30-May 3, 2012.
Guilin Star Diamond Superhard Material Co. Ltd., Brochure, Offshore Technology Conference Apr. 30-May 3, 2012.
Pilkey in Peterson's Stress Concentration Factors (2d ed., Wiley Interscience 1997), in Section 2.6.6, on p. 71 (1997).
International Preliminary Report on Patentability for International Application No. PCT/US20121055001 dated Mar. 18, 2014, 8 pages.
International Written Opinion for International Application for International Application No. PCT/2012/055001 dated Feb. 28, 2013, 7 pages.
Patel et al., U.S. Appl. No. 14/480,293 entitled, Multi-Chamfer Cutting Elements Having a Shaped Cutting Face, Earth-Boring Tools Including Such Cutting Elements, and Related Methods, filed Sep. 8, 2014.
Bilen et al., U.S. Appl. No. 13/461,388 entitled Earth-Boring Tools Having Cutting Elements with Cutting Faces Exhibiting Multiple Coefficients of Friction, and Related Methods, filed May 1, 2012.
International Search Report for International Application No. PCT/US2012/055001 dated Feb. 28, 2013, 3 pages.
Patel et al., U.S. Appl. No. 13/840,195 entitled Cutting Elements for Earth-Boring Tools, Earth-Boring Tools Including Such Cutting Elements, and Related Methods, filed Mar. 15, 2013.
Canadian Office Action and Examination Report for Canadian Application No. 2,848,651 dated Apr. 27, 2015, 3 pages.
Chinese Office Action and Search Report for Chinese Application No. 201280051840 dated May 27, 2015, 15 pages.

* cited by examiner

CUTTING ELEMENTS FOR EARTH-BORING TOOLS, EARTH-BORING TOOLS INCLUDING SUCH CUTTING ELEMENTS AND RELATED METHODS

CROSS-REFERENCE TO RELATED APPLICATION

This application claims the benefit of U.S. Provisional Patent Application Ser. No. 61/535,766, filed Sep. 16, 2011, entitled "Cutting Elements for Earth-Boring Tools, Earth-Boring Tools Including Such Cutting Elements and Related Methods," the disclosure of which is incorporated herein by reference in its entirety.

TECHNICAL FIELD

Embodiments of the present disclosure relate to earth-boring tools, cutting elements for such earth-boring tools, and related methods.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

BRIEF SUMMARY

In some embodiments, a cutting element for an earth-boring tool may comprise a superabrasive table positioned on a substrate, and at least one substantially planar recessed surface in a cutting face of the superabrasive table.

In further embodiments, an earth-boring tool may comprise at least one cutting element. The at least one cutting element may include a superabrasive table having a recessed surface in a cutting face thereof and a shaped feature in a substrate at the interface between the superabrasive table and the substrate, the shaped feature corresponding to the recessed surface in the cutting face of the superabrasive table.

In additional embodiments, an earth-boring tool may comprise at least one cutting element. The at least one cutting element may include a superabrasive table positioned on a substrate, and at least one substantially planar recessed surface in a cutting face of the superabrasive table.

In yet further embodiments, an earth-boring tool may comprise at least one cutting element. The at least one cutting element may include a superabrasive table positioned on a substrate; and a plurality of non-planar recessed surfaces in a cutting face of the superabrasive table.

In yet other embodiments, an earth-boring tool may comprise at least one blade and a plurality of cutting elements. Each cutting element of the plurality of cutting elements may include a superabrasive table positioned on a substrate; and at least one recessed surface in a cutting face of the superabrasive table. At least one cutting element of the plurality of cutting elements is affixed to one or more of a cone, a nose, a shoulder, and a gage region of the at least one blade.

BRIEF DESCRIPTION OF THE DRAWINGS

While the specification concludes with claims particularly pointing out and distinctly claiming what are regarded as embodiments of the present disclosure, various features and advantages of this disclosure may be more readily ascertained from the following description of example embodiments of the disclosure provided with reference to the accompanying drawings.

DETAILED DESCRIPTION

The illustrations presented herein are not actual views of any particular earth-boring tool, drill bit, or component of such a tool or bit, but are merely idealized representations which are employed to describe embodiments of the present disclosure.

As used herein, the term earth-boring tool means and includes any tool used to remove formation material and form a bore (e.g., a wellbore) through the formation by way of the removal of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, reamers (including expandable reamers and fixed-wing reamers), and other so-called "hole-opening" tools.

As used herein, the term "cutting element" means and includes any element of an earth-boring tool that is used to cut or otherwise disintegrate formation material when the earth-boring tool is used to form or enlarge a bore in the formation.

Figure 1:
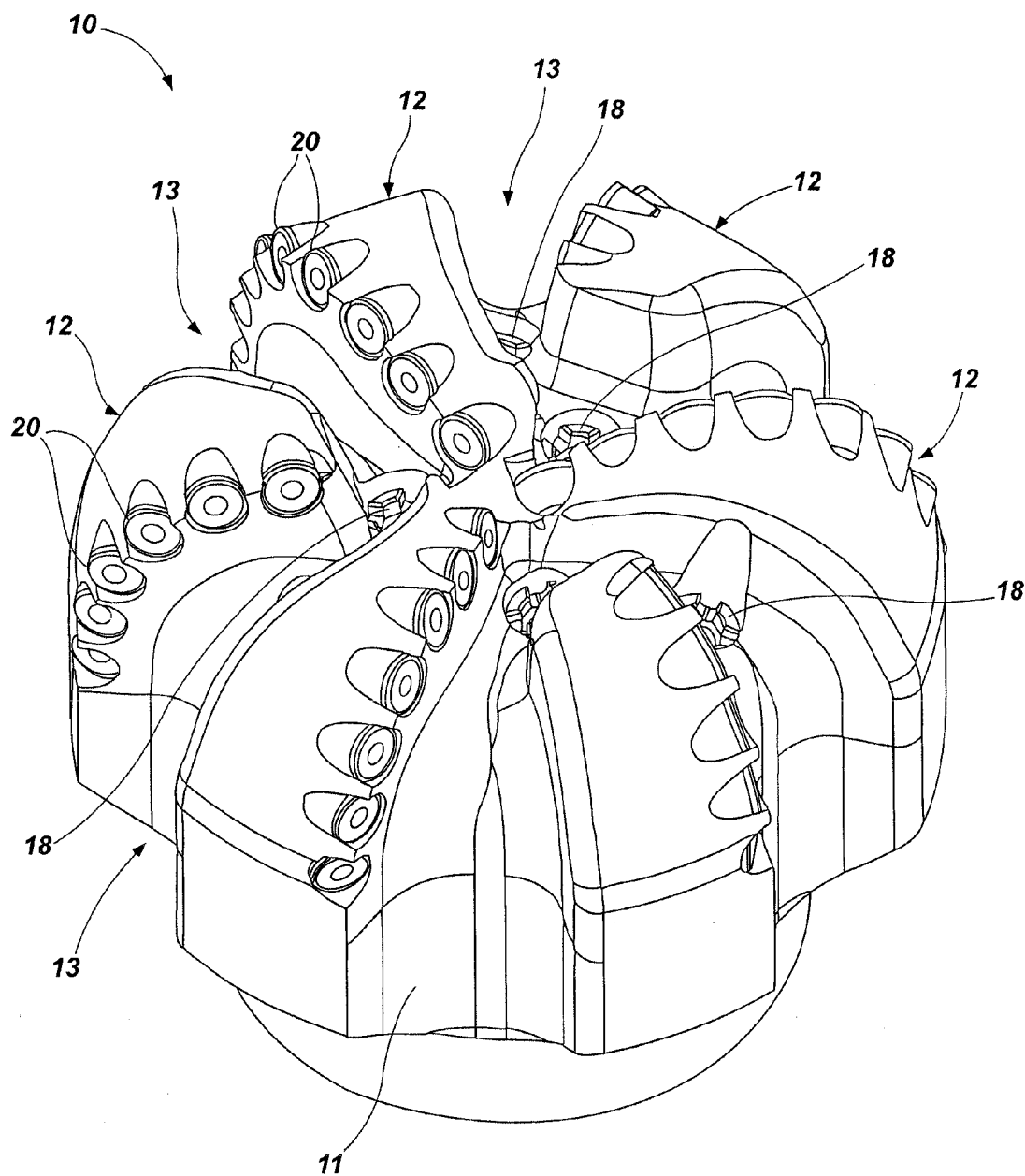
FIG. 1 is a perspective view of an earth-boring drill bit including cutting elements, according to an embodiment of the present disclosure.

FIG. 1 illustrates an embodiment of an earth-boring tool of the present disclosure. The earth-boring tool of FIG. 1 is a fixed-cutter rotary drill bit 10 having a bit body 11 that includes a plurality of blades 12 that project outwardly from the bit body 11 and are separated from one another by fluid courses 13. The portions of the fluid courses 13 that extend along the radial sides (the "gage" areas of the drill bit 10) are often referred to in the art as "junk slots." The bit body 11 further includes a generally cylindrical internal fluid plenum, and fluid passageways (not visible) that extend through the bit body 11 to the exterior surface of the bit body 11.

Nozzles 18 may be secured within the fluid passageways proximate the exterior surface of the bit body 11 for controlling the hydraulics of the drill bit 10 during drilling. A plurality of cutting elements 20 is mounted to each of the blades 12.

During a drilling operation, the drill bit 10 may be coupled to a drill string (not shown). As the drill bit 10 is rotated within the wellbore, drilling fluid may be pumped down the drill string, through the internal fluid plenum and fluid passageways within the bit body 11 of the drill bit 10, and out from the drill bit 10 through the nozzles 18. Formation cuttings generated by the cutting elements 20 of the drill bit 10 may be carried with the drilling fluid through the fluid courses 13, around the drill bit 10, and back up the wellbore through the annular space within the wellbore outside the drill string.

Figure 2:
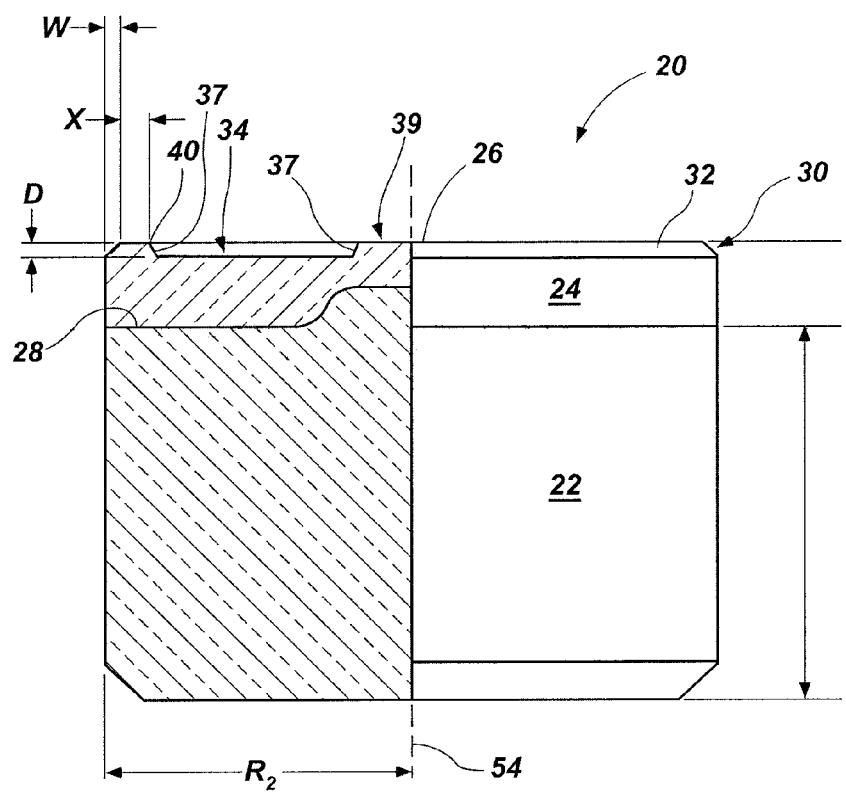
FIG. 2 is a partially cut-away side view of a cutting element having a recessed surface in a cutting face according to an embodiment of the present disclosure.

FIG. 2 is a side view of a partially cut-away of cutting element 20 of the drill bit 10 of FIG. 1. The cutting element 20 includes a cutting element substrate 22 having a superabrasive table, such as a diamond table 24 thereon. The diamond table 24 may comprise a polycrystalline diamond (PCD) material, having a cutting face 26 defined thereon. Superabrasive materials may also be characterized as "superhard" materials and include natural and synthetic diamond, cubic boron nitride and diamond-like carbon materials. Additionally, an interface 28 may be defined between the cutting element substrate 22 and diamond table 24. Optionally, the diamond table 24 may have a chamfered edge 30. The chamfered edge 30 of the diamond table 24 shown in FIG. 2 has a single chamfer surface 32, although the chamfered edge 30 also may have additional chamfer surfaces, and such additional chamfer surfaces may be oriented at chamfer angles that differ from the chamfer angle of the chamfer surface 32, as known in the art. The cutting element substrate 22 may have a generally cylindrical shape, as shown in FIG. 2. One or more arcuate, or "radiused" edges or edge portions may be employed in lieu of, or in addition to, one or more chamfered surfaces at a peripheral edge of the diamond table 24, as known to those of ordinary skill in the art.

The diamond table 24 may be formed on the cutting element substrate 22, or the diamond table 24 and the cutting element substrate 22 may be separately formed and subsequently attached together. The cutting element substrate 22 may be formed from a material that is relatively hard and resistant to wear. For example, the cutting element substrate 22 may be formed from and include a ceramic-metal composite material (which is often referred to as a "cermet" material). The cutting element substrate 22 may include a cemented carbide material, such as a cemented tungsten carbide material, in which tungsten carbide particles are cemented together in a metallic binder material. The metallic binder material may include, for example, cobalt, nickel, iron, or alloys and mixtures thereof. In some instances, cutting element substrate 22 may comprise two pieces, the piece immediately supporting the diamond table 24 and on which may be formed and bonded to another, longer piece of like diameter. In any case, the cutting elements 20 may be secured in pockets on blades 12 as depicted in FIG. 1, such as by brazing.

Figure 3:
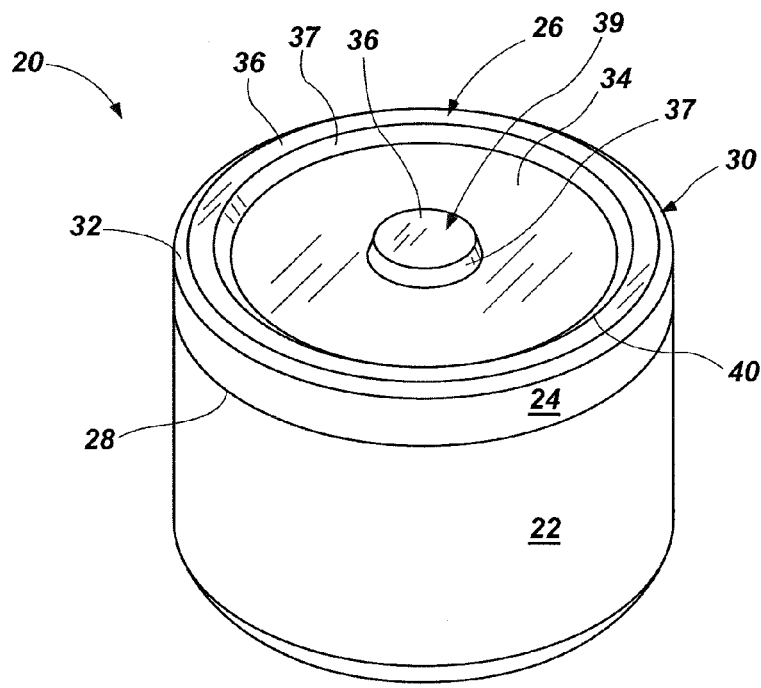
FIG. 3 is a perspective view of the cutting element of FIG. 2.

A recessed surface 34 may be defined in the cutting face 26 of the cutting element 20. For example, a generally annular, recessed surface 34 may be defined in the cutting face 26 of the cutting element 20, as shown in FIGS. 2 and 3. The recessed surface 34 may be positioned proximate to an edge of the cutting element 20, such as proximate to the chamfer surface 32. In some embodiments, the recessed surface 34 may be substantially planar and may be substantially parallel to a substantially planar surface 36 of the cutting face 26. As a non-limiting example, the recessed surface 34 may have a depth D of between about 0.0254 mm and about 2.54 mm relative to substantially planar surfaces 36 of the cutting face 26. The radially outer edge 40 of the recessed surface 34 may be positioned a distance X from the chamfer surface 32. The distance X may be greater than a width W of the chamfer edge 30 and may be substantially less than a radius $R_2$ of the cutting element 20. The chamfer edge 30 may have a width W of between about 0.254 mm and about 0.483 mm. In one embodiment, the chamfer edge 30 may have a width W of about 0.254 mm. In another embodiment, the chamfer edge 30 may have a width W of about 0.406 mm. In a further embodiment, the chamfer edge 30 may have a width W of about 0.483 mm. Additionally, at least one angled surface 37 (e.g., angled relative to the substantially planar cutting surface 36 of the cutting face 26) may extend between the substantially planar surface 36 of the cutting face 26 and the recessed surface 34.

Figure 4:
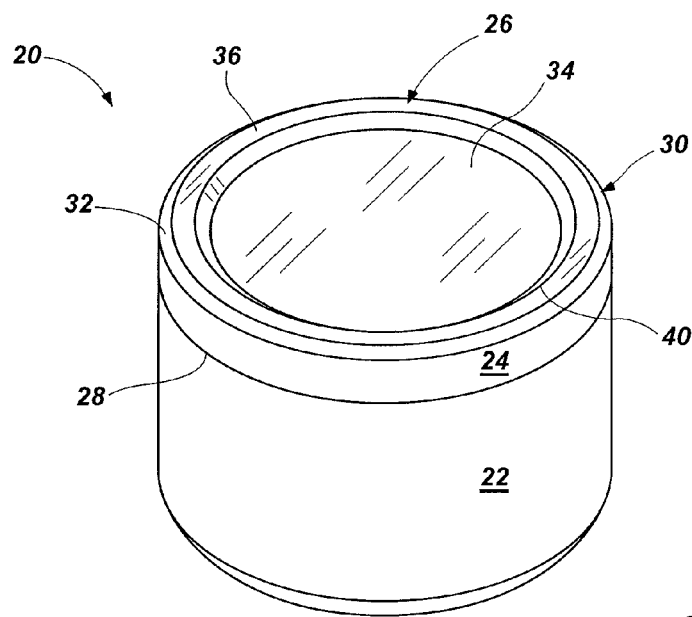
FIG. 4 is a perspective view of a cutting element including a recessed surface having a generally circular shape, according to an embodiment of the present disclosure.
Figure 5:
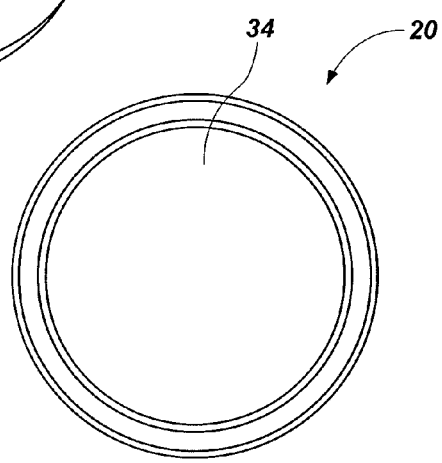
FIG. 5 is a plan view of the cutting element shown in FIG. 4.
Figure 6:
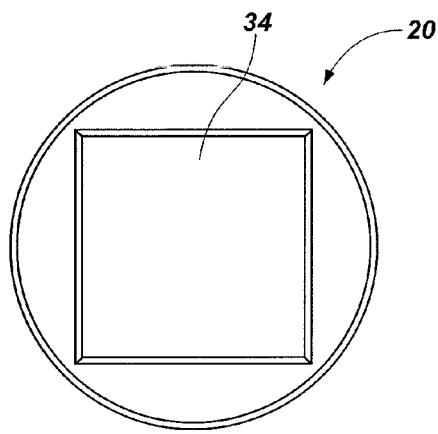
FIG. 6 is a plan view of a cutting element including a recessed surface having a generally square shape, according to an embodiment of the present disclosure.
Figure 7:
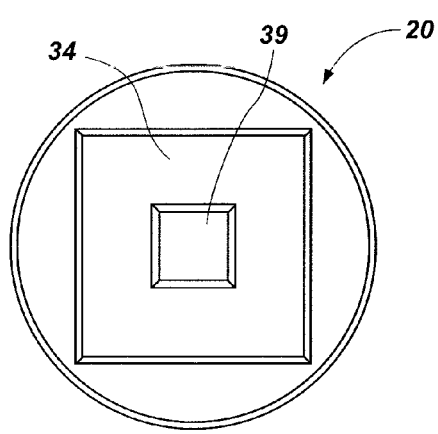
FIG. 7 is a plan view of a cutting element including a recessed surface having a generally square shape and a central island or protrusion, according to an embodiment of the present disclosure.
Figure 8:
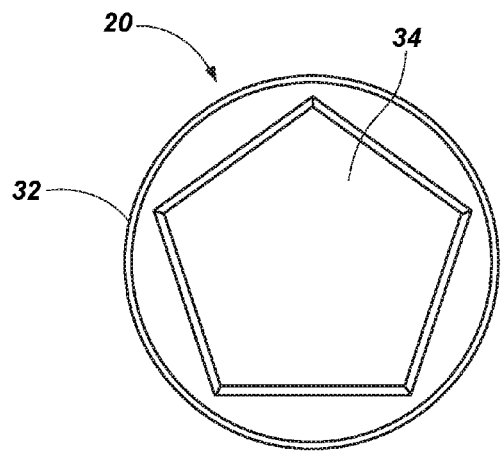
FIG. 8 is a plan view of a cutting element including a recessed surface having a generally pentagonal shape, according to an embodiment of the present disclosure.
Figure 9:
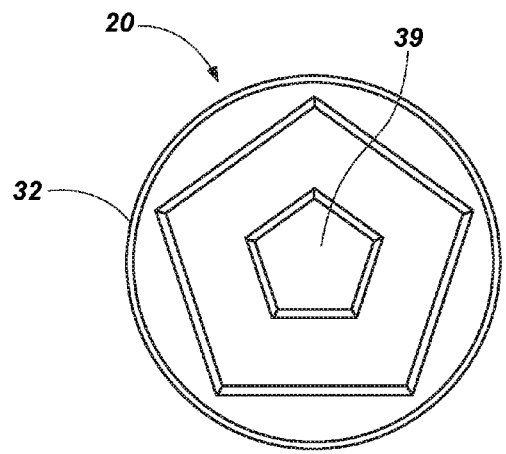
FIG. 9 is a plan view of a cutting element including a recessed surface having a generally pentagonal shape and a central island or protrusion, according to an embodiment of the present disclosure.
Figure 10:
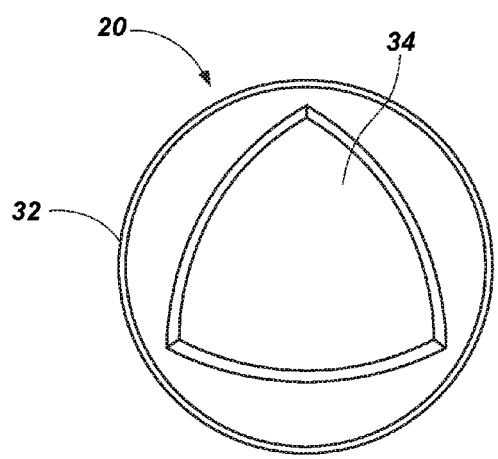
FIG. 10 is a plan view of a cutting element including a recessed surface shaped generally as a Reuleaux polygon, according to an embodiment of the present disclosure.
Figure 11:
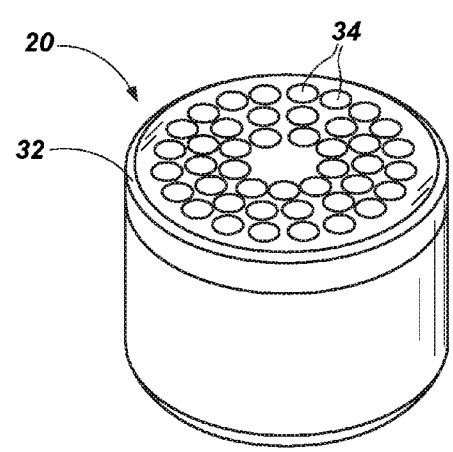
FIG. 11 is a perspective view of a cutting element including a plurality of recessed surfaces having a generally circular shape and arranged in a generally annular configuration, according to an embodiment of the present disclosure.
Figure 12:
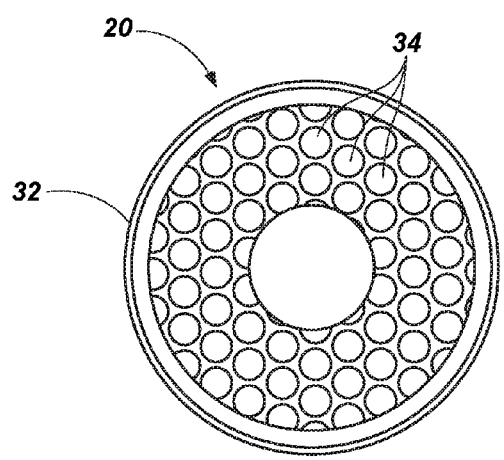
FIG. 12 is a plan view of the cutting element of FIG. 11.

In additional embodiments, the recessed surface 34 may be defined by shapes other than an annulus. For example, the recessed surface 34 may have a generally circular shape, such as shown in FIGS. 4 and 5. For another example, the recessed surface 34 may be generally shaped as a regular n-sided polygon, where n may have any value from three (3) to infinity, whereby n equal to infinity is equivalent to the aforementioned circular embodiment. In one embodiment, as shown in FIGS. 6 and 7, the recessed surface 34 may be generally shaped as a square. In another embodiment, as shown in FIGS. 8 and 9, the recessed surface 34 may be generally shaped as a pentagon. In some embodiments, an island or protrusion 39 may be positioned at or near a center of the recessed surface 34, such as shown in FIGS. 2, 3, 7 and 9. The protrusion 39 may have an average feature height defined by a plane that is coplanar with the substantially planar surface 36 of the cutting face 26, as shown in FIG. 3. However, in alternative embodiments, the protrusion 39 may have an average feature height above or below the substantially planar surface 36 of the cutting face 26. In additional embodiments, the recessed surface 34 may be generally shaped as a Reuleaux polygon (i.e., a curvilinear polygon built up of circular arcs), such as a Reuleaux triangle as shown in FIG. 10.

Figure 13:
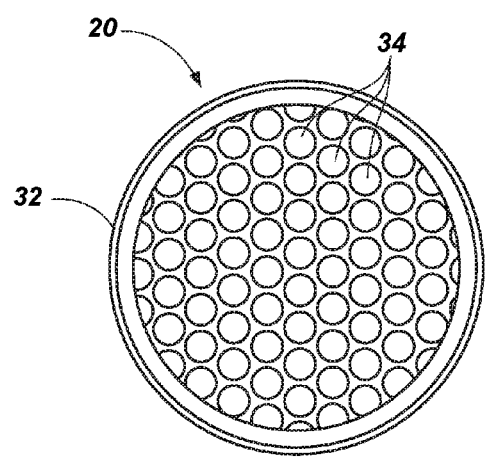
FIG. 13 is a plan view of a cutting element including a plurality of recessed surfaces having a generally circular shape and arranged in a generally circular configuration, according to an embodiment of the present disclosure.
Figure 14:
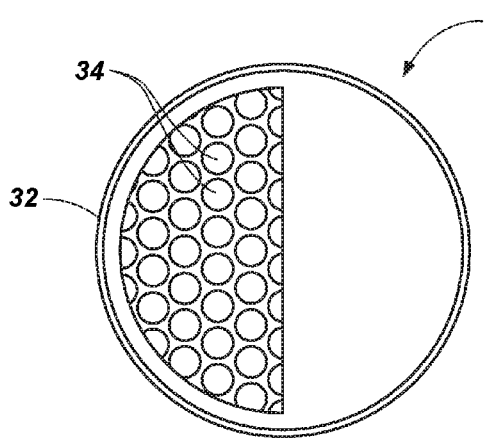
FIG. 14 is a plan view of a cutting element including a plurality of recessed surfaces having a generally circular shape and arranged proximate to an intended cutting edge, according to an embodiment of the present disclosure.
Figure 15:
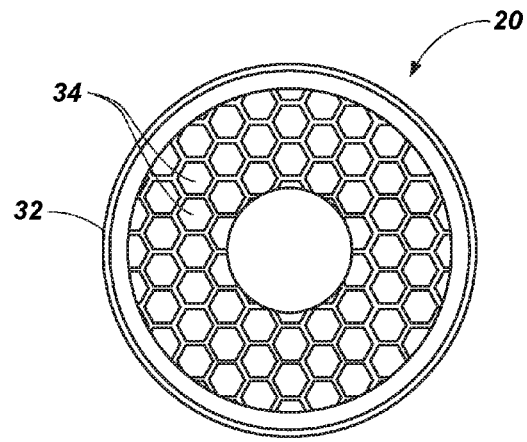
FIG. 15 is a plan view of a cutting element including a plurality of recessed surfaces having a generally polygonal shape and arranged in a generally annular configuration, according to an embodiment of the present disclosure.
Figure 16:
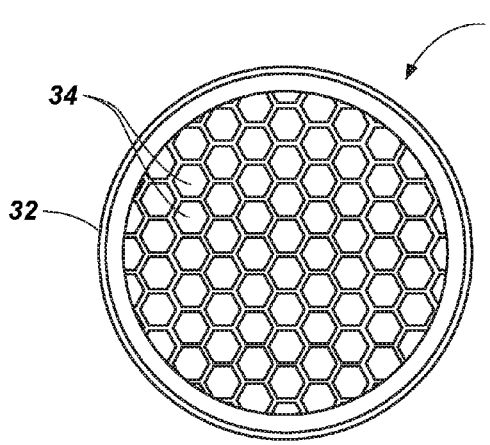
FIG. 16 is a plan view of a cutting element including a plurality of recessed surfaces having a generally polygonal shape and arranged in a generally circular configuration, according to an embodiment of the present disclosure.
Figure 17:
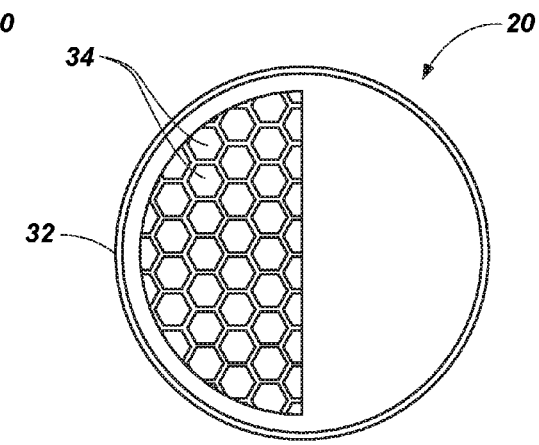
FIG. 17 is a plan view of a cutting element including a plurality of recessed surfaces having a generally polygonal shape and arranged proximate to an intended cutting edge, according to an embodiment of the present disclosure.
Figure 18:
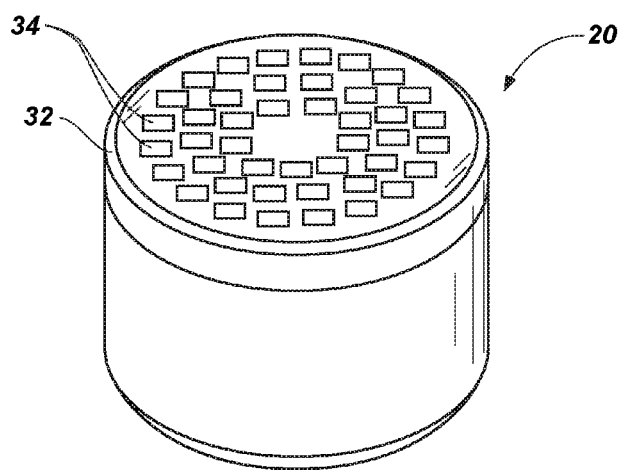
FIG. 18 is a perspective view of a cutting element including a plurality of recessed surfaces having a generally polygonal shape and arranged in a generally annular configuration, according to an embodiment of the present disclosure.

In some embodiments, a cutting element 20 may include a plurality of recessed surfaces 34 spaced a distance X from a chamfer surface 32, such as shown in FIGS. 11-18. In some embodiments, the plurality of recessed surfaces may comprise a plurality of generally circular shaped recessed surfaces, such as shown in FIGS. 11-14. For example, a region of a cutting face of the cutting element 20 may have the appearance of a dimpled surface of a golf ball. In further embodiments, the plurality of recessed surfaces may comprise a plurality of generally polygonal shaped recessed surfaces, such as hexagon shapes as shown in FIGS. 15-17, or rectangular shapes as shown in FIG. 18. In some embodiments, the plurality of recessed surfaces 34 may be distributed in a generally annular region of the cutting face of the cutting element 20, such as shown in FIGS. 11, 12, 15 and 18. In further embodiments, the plurality of recessed surfaces 34 may be distributed in a generally circular region of the cutting face of the cutting element 20, such as shown in FIGS. 13 and 16. In yet further embodiments, the plurality of recessed surfaces 34 may be distributed only in a region of the cutting face of the cutting element 20 that is near to an intended cutting edge of the cutting element, such as shown in FIGS. 14 and 17.

Figure 19:
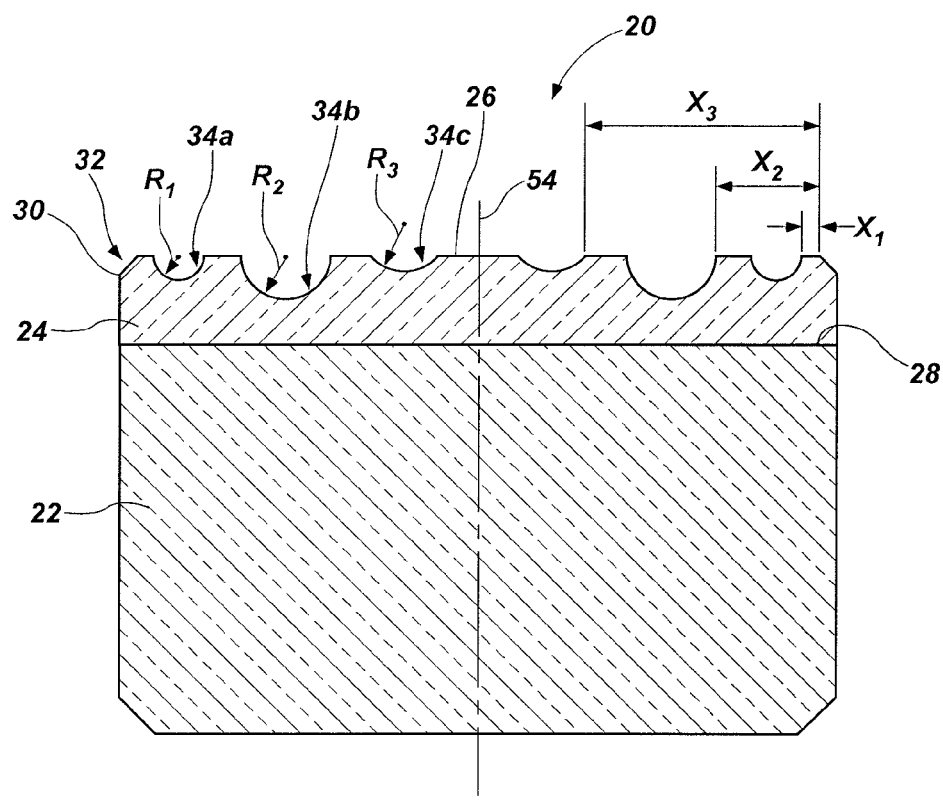
FIG. 19 is a cross-sectional side view of a cutting element having three (3) arcuate-shaped cross-sectional recessed surfaces formed in the cutting face of the cutting element, according to an embodiment of the present disclosure.
Figure 20:
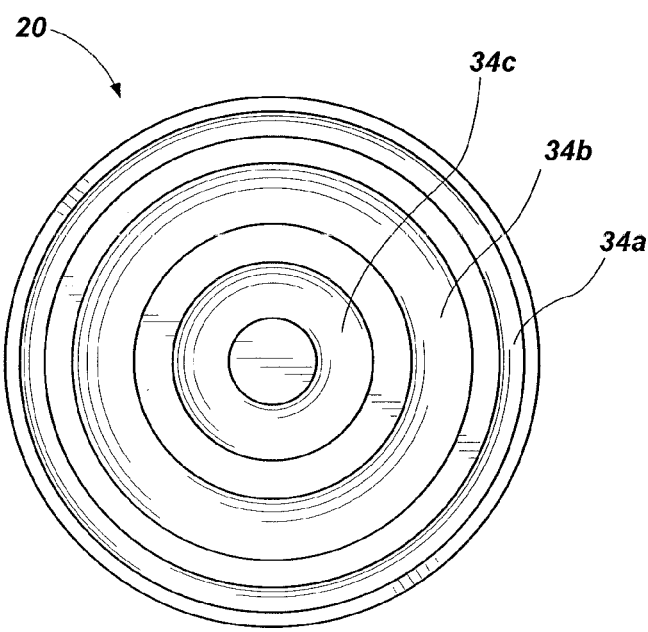
FIG. 20 is a plan view of the cutting element of FIG. 19, illustrating the annular, concentric, symmetrical orientation of the arcuate-shaped recessed surfaces, according to an embodiment of the present disclosure.

In some embodiments, as shown in FIGS. 19 through 22, a cutting element 20 may include a plurality of nested non-planar recessed surfaces 34, wherein each of the non-planar recessed surfaces is configured to engage the formation at a specific depth-of-cut. FIGS. 19 and 20 illustrate an embodiment of a cutting element 20 having a plurality of annular, concentric recessed surfaces 34 defined in the cutting face 26 of the cutting element 20. The recessed surfaces 34 are symmetrical about a longitudinal axis 54 of the cutting element 20. FIG. 19 illustrates a cross-sectional side view of a cutting element 20 according to such an embodiment. The cutting element 20 includes a cutting element substrate 22 having a superabrasive table thereon, such as diamond table 24, as previously described. FIG. 19 shows a generally planar interface 28 defined between the cutting element substrate 22 and the diamond table 24, although any interface geometry is within the scope of the present disclosure. Optionally, the diamond table 24 may have a chamfered edge 30 and a chamfer surface 32, as previously described herein.

The diamond table 24 may define three non-planar recessed surfaces 34a, 34b, 34c formed in the cutting face 26. Each of the recessed surfaces 34a, 34b, 34c depicted in FIG. 19 is symmetrical about the longitudinal axis 54 of the cutting element 20. Each of the recessed surfaces 34a, 34b, 34c may have an arcuately-shaped cross-section or "contour," and each contour may be of a different radius. For example, a first, radially outermost recessed surface 34a may have first cross-sectional radius $R_1$; a second recessed surface 34b may have a second cross-sectional radius $R_2$; and a third recessed surface 34c may have a third cross-sectional radius $R_3$. As shown in FIG. 19, the third radius $R_3$ is greater than both the first radius $R_1$ and second radius $R_2$, and the second radius $R_2$ is greater than the first radius $R_1$. Moreover, the radially outer edge of the first recessed surface 34a may be positioned a first distance $X_1$ from the chamfer surface 32; the radially outer edge of the second recessed surface 34b may be positioned a second distance $X_2$ from the chamfer surface 32; and the radially outer edge of the third recessed surface 34c may be positioned a third distance $X_3$ from the chamfer surface 32. As shown in FIG. 19, the third distance $X_3$ is greater than both the first distance $X_1$ and the second distance $X_2$, and the second distance $X_2$ is greater than the first distance $X_1$. In this manner, the recessed surfaces 34a, 34b, 34c may be respectively located to engage formation material at different respective depths-of-cut, or alternatively, after the diamond table 24 has worn to different extents.

Figure 21:
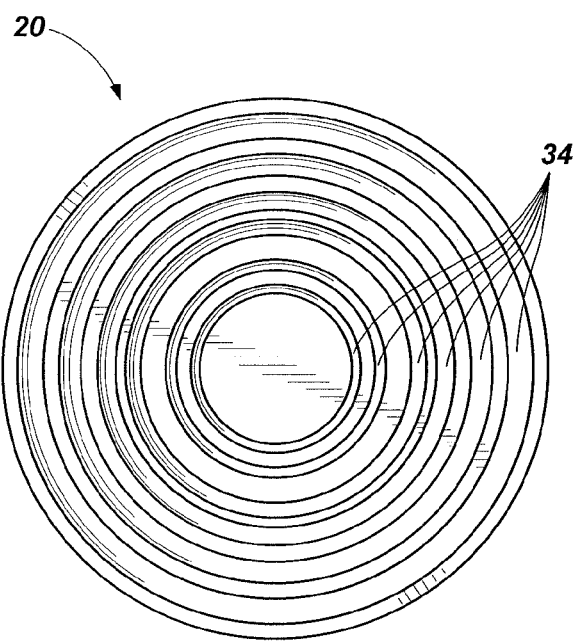
FIG. 21 is a plan view of a cutting element having six (6) arcuate-shaped cross-sectional recessed surfaces formed in a cutting face of the cutting element illustrating an annular, concentric, symmetrical orientation of the recessed surfaces, according to an embodiment of the present disclosure.

As shown in FIG. 20, the recessed surfaces 34a, 34b, 34c may be annular surfaces concentrically aligned, and each may be symmetrical about the longitudinal axis 54 (FIG. 19) of the cutting element 20. It is to be appreciated that the three recessed surfaces 34a, 34b, 34c depicted in FIGS. 19 and 20 are merely one alternative of any number of concentric, annular recessed surfaces which may be formed in the cutting face 26 of a cutting element 20 according to the present disclosure. In additional embodiments, more than three or less than three recessed surfaces 34 may be formed in the cutting face 26 of the cutting element 20. FIG. 21 illustrates a cutting element 20 having more than three recessed surfaces 34 formed in the cutting face 26 of the cutting element 20. By adjusting the parameters of the recessed surfaces 34a-34c of the cutting element 20 of FIGS. 19 through 21, a plurality of specific, tailored performance characteristics can be imparted to the cutting element 20. For example, the radius of each recessed surface 34a-34c may be set according to a predetermined degree of cutting aggressivity and efficiency desired for that radial region of the cutting element 20. For example, recessed surfaces with smaller respective radiuses, such as recessed surface 34a with radius $R_1$ of FIG. 19, may be utilized to manage residual stresses in the diamond table 24 and increase durability of the cutting element 20. Additionally, recessed surfaces with larger respective radiuses, such as recessed surface 34b with radius $R_2$ of FIG. 19, may be utilized to increase the aggressivity and efficiency of the cutting element 20. Moreover, the utilization of multiple nested recessed surfaces 34a-34c in the cutting face 26 reduces stress concentrations in the cutting face 26 and diamond table 24, which may increase the durability and longevity of the cutting element 20. The benefits regarding such reduction in stress concentration is explained by author Walter D. Pilkey in PETERSON'S STRESS CONCENTRATION FACTORS (2d ed., Wiley Interscience 1997), in Section 2.6.6, on page 71. Thus, by utilizing the concentric, nested configuration of the recessed surfaces 34a-34c in the cutting element 20 depicted in FIGS. 19 through 21, cutting performance characteristics, such as aggressivity and efficiency, may be tailored to occur at a predetermined depth-of-cut, while balancing durability over a greater portion of the cutting face 26. For example, if a high cutting aggressivity and efficiency are desired at a shallow depth-of-cut, an annular recessed surface with a large respective radius, such as recessed surface 34b with radius $R_2$ of FIG. 19, may be located at a relatively short radial distance, such as $X_1$, from the chamfer surface 20 of the diamond table 24. Additionally, if residual stress management is also desired on the diamond table 24 at a greater depth-of-cut, a recessed surface with a smaller respective radius, such as recessed surface 34a with radius $R_1$ of FIG. 19, may be nested radially inward, such as at radial distance $X_2$ or $X_3$ of FIG. 19, of the more aggressive recessed surface.

Figure 22:
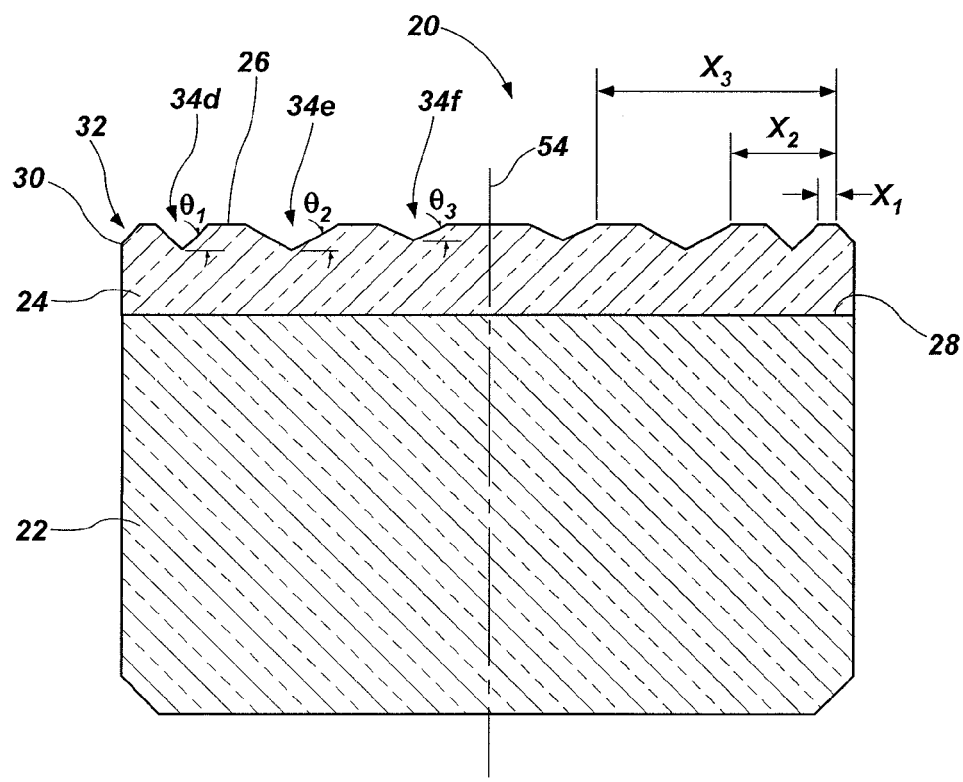
FIG. 22 is a cross-sectional side view of a portion of a superabrasive table of a cutting element having three (3) chevron-shaped cross-sectional recessed surfaces formed in a cutting face of the cutting element, according to an embodiment of the present disclosure.

While FIG. 19 illustrates the recessed surfaces 34a-34c as being semicircular arcuate shapes, i.e., having one cross-sectional radius, in alternative embodiments, semielliptical cross-sectional shapes may be utilized. Furthermore, in other embodiments, non-planar recessed surfaces with cross-sectional geometries other than arcuate shapes may be formed in the cutting face 26 of the cutting element 20. FIG. 22 depicts three annular, concentric, chevron-shaped recessed surfaces 34d, 34e, 34f formed in the cutting face 26 of the cutting element 20. The cutting element 20 of FIG. 22 may otherwise be configured similarly to the cutting element 20 of FIGS. 19 and 20. Each of the recessed surfaces 34d, 34e, 34f depicted in FIG. 22 is symmetrical about the longitudinal axis 54 of the cutting element 20. Thus, it is to be recognized that the chevron-shaped recessed surfaces are non-planar in a three-dimensional space. Each chevron-shaped recessed surface 34d, 34e, 34f may have a symmetrical chevron shape, as depicted in FIG. 22. In alternative embodiments, non-symmetrical chevron shapes may be utilized. In yet other embodiments, a cutting face 26 may include one or more symmetrical chevron-shaped recessed surfaces in combination with one or more non-symmetrical chevron-shaped recessed surfaces. Referring again to FIG. 22, a first, radially outermost, symmetrical, chevron-shaped recessed surface 34d may extend to a first depth within the diamond table 24 at a first angle $\theta_1$ with respect to the planar, longitudinally outer surface of the cutting face 26. A second, symmetrical, chevron-shaped recessed surface 34e may extend to a second depth within the diamond table 24 at a second angle $\theta_2$ with respect to the planar, longitudinally outer surface of the cutting face 26. A third recessed surface 34f may extend to a third depth within the diamond table 24 at a third angle $\theta_3$ with respect to the planar, longitudinally outer surface of the cutting face 26. The angles $\theta_1$, $\theta_2$, $\theta_3$ may be equivalent or unique with respect to one another. For example, FIG. 22 depicts angles $\theta_2$ and $\theta_3$ as being equivalent, and both being greater than $\theta_1$. Moreover, the depth to which the second and third chevron-shaped recessed surfaces 34e, 34f extends from the cutting face 26 into the diamond table 24 is depicted as being equivalent, with both being less than the depth to which the first chevron-shaped recessed surface 34d extends from the cutting face 26 into the diamond table 24. With continued reference to FIG. 22, the radially outer edge of the first recessed surface 34d may be positioned a distance $X_1$ from the chamfer surface 32; the radially outer edge of the second recessed surface 34e may be positioned a distance $X_2$ from the chamfer surface 32; and the radially outer edge of the third recessed surface 34f may be positioned a distance $X_3$ from the chamfer surface 32. As shown in FIG. 22, the third distance $X_3$ is greater than both the first distance $X_1$ and the second distance $X_2$, and the second distance $X_2$ is greater than the first distance $X_1$. In this manner, the recessed surfaces 34d, 34e, 34f may be respectively located to engage formation material at a specific depth-of-cut, or alternatively, after the diamond table 24 has worn to a specific extent.

As described above with reference to the arcuate-shaped recessed surfaces 34a-34c of FIGS. 19 through 21, more than three or less than three chevron-shaped recessed surfaces 34d-34f may be formed in the cutting face 26 of the cutting element 20. Furthermore, as described above, by adjusting the parameters of the chevron-shaped recessed surfaces 34d-34f of the cutting element 20 of FIG. 22, including angles $\theta_1$-$\theta_3$, radial distances $X_1$-$X_3$ from the chamfer surface 32, and depth into the diamond table 24 from the cutting face 26, a plurality of specific, tailored performance characteristics, such as durability, aggressivity, and efficiency, can be imparted to the cutting element 20 at different radial locations, i.e., depth-of-cut locations, on the cutting face 26. Additionally, any combination of planar and/or non-planar cross-sectionally shaped recess surfaces 34a-34f may be utilized in a single cutting element 20. For example, a combination of arcuate-shaped recessed surfaces 34a-34c, chevron-shaped recessed surfaces 34d-34f, and alternatively-shaped recessed surfaces may be nested in a concentric pattern on the cutting face 26. Furthermore, in yet additional embodiments, planar and/or non-planar recessed surfaces 34, such as the arcuate and chevron cross-sectional recessed surfaces 34a-34f shown in FIGS. 19 and 22, may be utilized on a cutting face 26 in a non-concentric configuration. Moreover, a nested configuration of planar and/or non-planar recessed surfaces 34a-34f may be utilized in a non-symmetrical pattern with respect to the longitudinal axis 54 (FIGS. 19 and 22) of the cutting element 20. It is to be appreciated that a plurality of recessed surfaces 34 of any combination of cross-sectional shapes, patterns, dimensions, and orientations, as disclosed above, may be utilized in a single cutting face 26 to impart a desired performance characteristic to a cutting element 20.

The one or more recessed surfaces 34 may be formed in the diamond table 24 after the diamond table 24 has been formed, such as by using electrical discharge machining (EDM), whereby a desired shape is achieved by using electrical discharges from an electrode (not shown). In some embodiments, the diamond table 24 may be moved relative an electrode having a shape of a desired cross-section of the recessed surface 34 (and/or the electrode may be moved along a desired path relative to the diamond table 24) to form the recessed surface 34 (FIG. 3). For example, an electrode having a polygonal shape may be lowered into the cutting face 26 of the diamond table 24, and then the diamond table 24 may be rotated to form a recessed surface 34 comprising a polygonal groove following an annular path. In additional embodiments, one or more electrode dies having a negative shape of the desired recessed surface or surfaces 34 (i.e., one or more protrusions), may be sunk into the cutting face 26 of the diamond table 24 to form one or more recessed surfaces 34.

Figure 23:
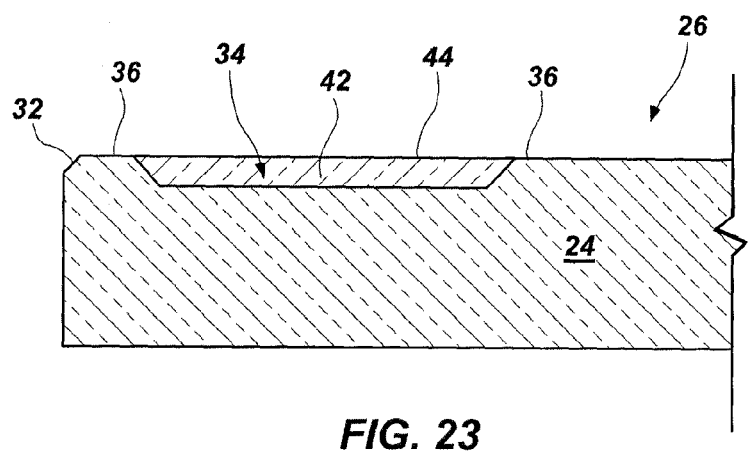
FIG. 23 is a cross-sectional view of a portion of a superabrasive table of a cutting element having a recessed surface substantially filled with a sacrificial structure, according to an embodiment of the present disclosure.
Figure 24:
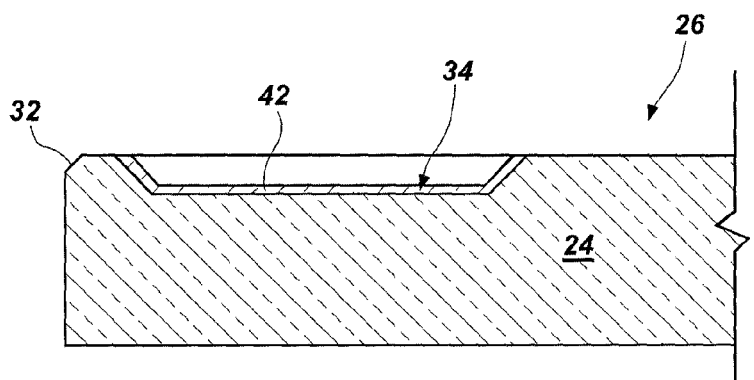
FIG. 24 is a cross-sectional view of a portion of a superabrasive table of a cutting element with a relatively thin sacrificial structure positioned over a surface of a recessed surface, according to an embodiment of the present disclosure.

In some embodiments, the one or more recessed surfaces 34 in the diamond table 24 may include one or more sacrificial structures 42 positioned therein. For example, one or more sacrificial structures 42 may substantially fill the area over the one or more recessed surfaces 34 in the diamond table 24, such that a surface 44 of each sacrificial structure 42 may be substantially aligned and coplanar with the adjacent, substantially planar surfaces 36 of the cutting face 26 of the diamond table 24, as shown in FIG. 23. In another example, each sacrificial structure 42 may be a relatively thin material layer positioned over the recessed surface 34, as shown in FIG. 24. In some embodiments, each sacrificial structure 42 may be comprised of a material that is softer than the diamond table 24, or that is otherwise more susceptible to wear than the diamond table 24, such as one or more of a ceramic, a cermet and a refractory metal. For example, the material of each sacrificial structure 42 may be one or more of tungsten carbide, aluminum oxide, tungsten, niobium, tantalum, hafnium, molybdenum, and carbides formed therefrom.

In such embodiments, the recessed surface 34 may be formed into the diamond table 24 during the formation of the diamond table 24. For example, each sacrificial structure 42 may be positioned within a mold (not shown) and powdered precursor material comprising diamond particles may be positioned over (e.g., around) each sacrificial structure 42. Then, the powdered precursor material may be compacted and sintered in the presence of a catalyst mixed with the diamond particles or swept from an adjacent substrate as known in the art to form the diamond table 24, with each sacrificial structure 42 forming a corresponding recessed surface 34 in the diamond table 24. Each sacrificial structure 42, or a portion thereof, may then be removed, such as by sandblasting, machining, acid leaching or another process, or each sacrificial structure 42, or a portion thereof, may remain positioned in each corresponding recessed surface 34 to be removed by the formation during drilling operations. Additionally, for embodiments wherein each sacrificial structure 42, or a portion thereof, may then be removed, such as by sandblasting, machining, acid leaching or another process, the diamond table 24 may be machined, such as by an EDM process, to a final geometry.

In further embodiments, a powder preform, such as diamond comprising powder contained in a cylindrical niobium cup, may be positioned adjacent a shaped mold, such as a mold having a shaped protrusion, during at least a portion of the sintering process. For example, the powder preform may be positioned adjacent the shaped mold (not shown) during a high-pressure/high-temperature (HPHT) process and a shape imparted by the shaped mold may be retained throughout a sintering cycle to form a recessed surface 34 in the diamond table 24. In further embodiments, the shape imparted by the mold may be near a desired net shape of the one or more recessed surfaces 34, and the final shape of the one or more recessed surfaces 34 may be machined, such as by an EDM process, to a final geometry.

Optionally, the catalyst material may be removed from the hard polycrystalline material of the diamond table 24 after the HPHT process, as known in the art. For example, a leaching process may be used to remove catalyst material from interstitial spaces between the inter-bonded grains of the hard polycrystalline material of the diamond table 24. By way of example and not limitation, the hard polycrystalline material may be leached using a leaching agent and process such as those described more fully in, for example, U.S. Pat. No. 5,127,923 to Bunting et al., (issued Jul. 7, 1992), and U.S. Pat. No. 4,224,380 to Bovenkerk et al., (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded grains in the hard polycrystalline material of the diamond table 24. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the hard polycrystalline material of the diamond table 24 for a period of about two hours to about 60 hours, depending upon the size of the body comprising the hard polycrystalline material. After leaching the hard polycrystalline material, the interstitial spaces between the inter-bonded grains within the hard polycrystalline material may be at least substantially free of catalyst material used to catalyze formation of inter-granular bonds between the grains in the hard polycrystalline material. In some embodiments, leaching may be selectively applied to specific regions of the diamond table 24, and not to other regions. For example, in some embodiments, a mask may be applied to a region of the diamond table 24, such as one or more recessed surfaces 34 or a region of a recessed surface 34 in the diamond table 24, and only the unmasked regions may be leached.

Additionally, an outer surface of the diamond table 24 may be physically modified, such as by polishing to a smooth or mirrored finish. For example, an outer surface of the diamond table 24 may have a reduced surface roughness, such as described in U.S. Pat. No. 6,145,608, which issued on Nov. 14, 2000 to Lund et al., and is assigned to the assignee of the present application; U.S. Pat. No. 5,653,300, which issued Aug. 5, 1997 to Lund et al., and is assigned to the assignee of the present application; and U.S. Pat. No. 5,447,208, which issued Sep. 5, 1995 to Lund et al., and is assigned to the assignee of the present application, the disclosure of each of which is incorporated herein in its entirety by this reference.

In conventional PDC cutting elements, a cutting face or leading face of PDC might be lapped to a surface finish of 20 μin. (about 0.508 μm) to 40 μin. (about 1.02 μm) root mean square RMS (all surface finishes referenced herein being RMS), which is relatively smooth to the touch and visually planar (if the cutting face is itself flat), but which includes a number of surface anomalies and exhibits a degree of roughness which is readily visible to one even under very low power magnification, such as a 10× jeweler's loupe. However, an exterior surface of the diamond table 24 may be treated to have a greatly reduced surface roughness. As a non-limiting example, an exterior surface of the diamond table 24 may be polished a surface roughness of about 0.5 μin. (about 0.0127 μm) RMS.

In some embodiments, the surface roughness of a surface of the diamond table 24 may be reduced by lapping of the cutting face 26 on conventional cast iron laps known in the art by using progressively smaller diamond grit suspended in a glycol, glycerine or other suitable carrier liquid. The lapping may be conducted as a three-step process commencing with a 70-micron grit, progressing to a 40-micron grit and then to a grit of about 1 to 3 microns in size. In contrast, standard lapping techniques for a PDC cutting element, which may follow an initial electrodischarge grinding of the cutting face, finish lapping in one step with 70-micron grit. By way of comparison of grit size, 70-micron grit is of the consistency of fine sand or crystalline material, while 1 to 3 micron grit is similar in consistency to powdered sugar.

In additional embodiments, the surface roughness of a surface of the diamond table 24 may be reduced by placing the surface in contact with a dry, rotating diamond wheel. For example, the Winter RB778 resin bonded diamond wheel, offered by Ernst Winter & Son, Inc., of Travelers Rest, S.C., may be utilized. It may be important that the wheel be cooled as the diamond wheel is of resin-bonded construction. Elevated temperatures may result in the destruction of the wheel. The nature of the polishing process may require that the abrasive surface be kept dry. However, the wheel may be moistened with water at the start of the polishing process to reduce drag and facilitate proper orientation of the diamond table 24 against the wheel. In addition, a temperature range wherein polishing may be effected may be between about 140° F. (about 60° C.) and about 220° F. (about 104° C.). While specific polishers employed may rotate at about 3500 rpm, it is believed that a range between about 3000 rpm and about 5000 rpm would likely be adequate. About 2 lb. force (about 0.9 Kg) to about 8 lb. force (about 3.6 Kg) may be applied to the diamond table 24 against the wheel. As noted, the finish of an exterior surface of the diamond table 24 may be smoothed to about 0.5 μin. (about 0.0127 μm) RMS, or less, surface finish roughness approaching a true "mirror" finish. It may take about fifty minutes to about an hour of polishing with the aforementioned diamond wheel to achieve this finish on a surface of a one-half inch (about 1.27 cm) diameter diamond table 24, and about one and one-half to about two hours for a nominal three-quarter inch (about 1.905 cm) diameter diamond table 24. This same method described for polishing a face of the diamond table 24 may also be applied to polish the chamfer surface 32, as well as the side of the diamond table 24. To polish such surfaces, the diamond table 24, held by the substrate 22, is disposed at the desired angle to the rotating wheel. The cutting element 20 may then be rotated about an axis of symmetry to smooth and polish the chamfer surface 32 or other side areas of the diamond table 24. Thus, one could smooth and polish a curved, ridged, waved or other cutting face of a diamond table 24 to remove and reduce both large and small asperities, resulting in a mirror finish cutting face, which nonetheless is not flat in the absolute sense.

The cutting element cutting surfaces (cutting face, chamfer, side, etc.) may be polished by other methods, such as ion beams or chemicals, although the inherently inert chemical nature of diamond may make the latter approach somewhat difficult for diamond. The cutting element surfaces may also be polished by the use of lasers, as described in United States Patent Publication No. 2009/0114628, to DiGiovanni, which was published May 7, 2009, the entire disclosure of which is incorporated herein in its entirety by this reference.

While an industry-standard PDC or other superhard cutting element may have a lapped surface finish on the cutting face with irregularities or roughness (measured vertically from the surface) on the order of 20 μin. (about 0.508 μm) to 40 μin. (about 1.02 μm) RMS, as a result of the above-described polishing, some embodiments may have a diamond table 24 surface roughness between about 0.3 μin.

RMS and about 0.5 μin. (about 0.0127 μm) RMS. Additional embodiments may have a diamond table 24 surface roughness between about 0.4 μin. (about 0.0102 μm) RMS and about 0.6 μin. (about 0.0152 μm) RMS. In yet additional embodiments, the diamond table 24 may have a surface roughness less than about 10 μin. (about 0.254 μm) RMS. In further embodiments, the diamond table 24 may have a surface roughness less than about 2 μin. (about 0.0508 μm) RMS. In yet further embodiments, the diamond table 24 may have a surface roughness less than about 0.5 μin. (about 0.0127 μm) RMS, approaching a true "mirror" finish. In yet further additional embodiments, the diamond table 24 may have a surface roughness less than about 0.1 μin. (about 0.00254 μm). The foregoing surface roughness measurements of the diamond table 24 may be measured using a calibrated HOMMEL® America Model T-4000 diamond stylus profilometer contacting the surface of the diamond table 24.

In view of the foregoing, selected surfaces of the diamond table 24 may be polished or otherwise smoothed to have a reduced surface roughness. In some embodiments, the substantially planar surfaces 36 of the cutting face 26 may have a reduced surface roughness. In further embodiments, the recessed surface(s) 34 may have a reduced surface roughness. In yet further embodiments, the entire cutting face 26 of the diamond table 24 may have a reduced surface roughness. In additional embodiments, the chamfer 32 and/or other side surfaces of the diamond table 24 may have a reduced surface roughness. In yet additional embodiments, all of the exposed surfaces of the diamond table 24 may have a reduced surface roughness.

Figure 25:
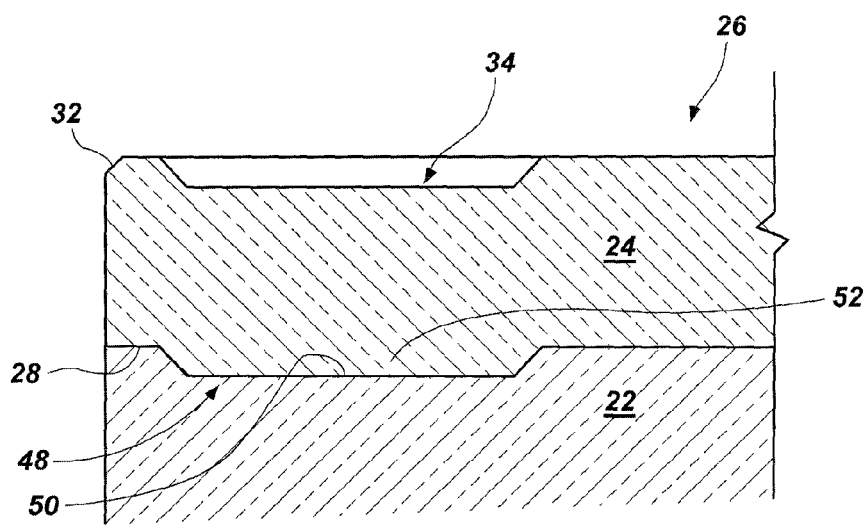
FIG. 25 is a cross-sectional view of a portion of a cutting element with a shaped region at an interface between a superabrasive table and a substrate corresponding to a shape of a recessed surface in a cutting face of the superabrasive table, according to an embodiment of the present disclosure.
Figure 26:
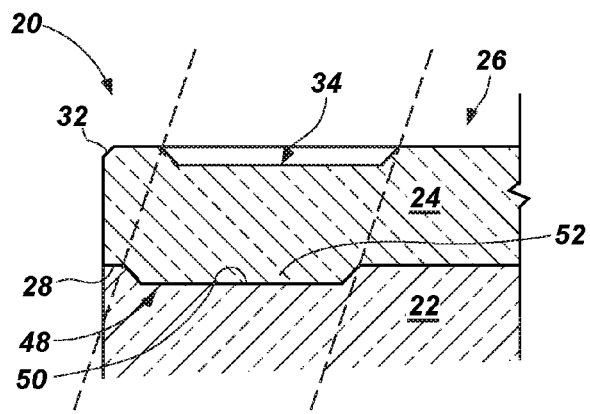
FIG. 26 is a cross-sectional view of a portion of a cutting element with a shaped region at an interface between a superabrasive table and a substrate corresponding to a shape of a recessed surface in a cutting face of the superabrasive table positioned radially outward of the recessed surface, according to an embodiment of the present disclosure.
Figure 28:
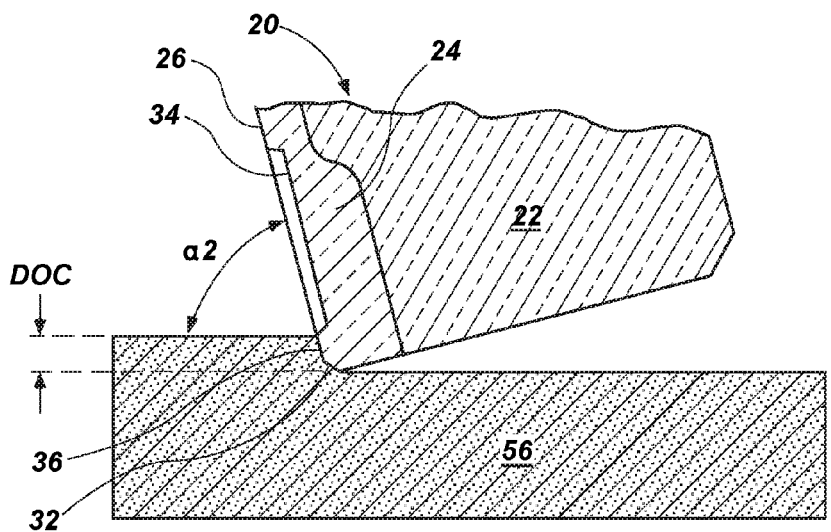
FIG. 28 is a cross-sectional view of a cutting element having a recessed surface in a cutting face of a superabrasive table interacting with a formation during drilling operations at a relatively high depth-of-cut, according to an embodiment of the present disclosure.

Referring now to FIG. 28, drilling forces caused by interaction between a formation 56 and the cutting element 20 may be exacerbated by stress concentrations within the diamond table 24 above that of an otherwise similar PDC cutter without a recessed surface feature 34. In view of this, a shape of the interface 28 between the diamond table 24 and the cutting element substrate 22 of the cutting element 20 may be configured to effectively distribute stresses caused by cutting forces, to improve the structural integrity of the cutting element 20. For example, a shaped region 48 corresponding to a shape of the one or more recessed surfaces 34 in the cutting face 26 of diamond table 24 may define a region of the interface 28, such as shown in FIGS. 25 and 26. In some embodiments, the shaped region 48 of the interface 28 may be defined by a recessed surface 50 in the substrate 22 and a protrusion 52 (FIGS. 25 and 26) of the diamond table 24 at the interface 28. In view of this, the shaped region 48 of the interface 28 may provide a generally uniform thickness of the diamond table 24. In some embodiments, the shaped region 48 of the interface 28 corresponding to the one or more recessed surfaces 34 in the diamond table 24 may be positioned directly, longitudinally, below the one or more recessed surfaces 34 in the diamond table 24, as shown in FIG. 25. In further embodiments, at least a portion of the shaped region 48 of the interface 28 corresponding to the one or more recessed surfaces 34 in the diamond table 24 may underlie the one or more recessed surfaces 34 at a position radially inward of the one or more recessed surfaces 34 relative to a longitudinal axis 54 (FIG. 2) of the cutting element 20. In additional embodiments, at least a portion of the shaped region 48 of the interface 28 corresponding to the one or more recessed surfaces 34 in the diamond table 24 may underlie the one or more recessed surfaces 34 at a position radially outward of the one or more recessed surfaces 34 relative to a longitudinal axis 54 (FIG. 2) of the cutting element 20, as shown in FIG. 26. Such a configuration may account for a projected direction of travel of the cutting element 20 relative to a formation (as indicated by the dashed lines in FIG. 26), as this may correspond to a primary general direction of cutting forces applied to the cutting element 20 during drilling operations. In other words, the shaped region of the interface 28 may be sized, shaped and positioned to reduce stress concentrations, and/or to provide sufficient structural strength to withstand anticipated stress concentrations, that may result from drilling operations. Furthermore, the diamond layering composition of the diamond table 24 may be tailored in the shaped region of the interface 28 to compensate for residual stresses and provide a tailored material property of the diamond table 24, such as a tailored strength and toughness, in the shaped region of the interface 28.

In some embodiments, a depth-of-cut limiting feature on an earth-boring tool may be positioned to inhibit interaction between an uncut earth formation and one or more recessed surfaces 34 in the cutting face 26 of the diamond table 24 during earth-boring operations. For example, the depth-of-cut limiting feature on an earth-boring tool may be one or more of an outer surface of a blade 12 of the drill bit 10 shown in FIG. 1 and a bearing block feature as described in U.S. patent application Ser. No. 12/766,988, filed Apr. 26, 2010, for "BEARING BLOCKS FOR DRILL BITS, DRILL BIT ASSEMBLIES INCLUDING BEARING BLOCKS AND RELATED METHODS," the disclosure of which is incorporated herein in its entirety by this reference. For example, the depth-of-cut limiting feature may be positioned to be aligned with a radially outer edge of a recessed surface 34 in the cutting face 26 of the diamond table 24. In view of this, uncut formation may be prevented from contact with the recessed surface 34 during drilling operations, such that the planar surface 36 of the cutting face 26 and the chamfer surface 32, positioned radially outward (relative to a primary axis of the cutting element 20) of the recessed surface 34 may interact with the uncut formation 56.

Figure 27:
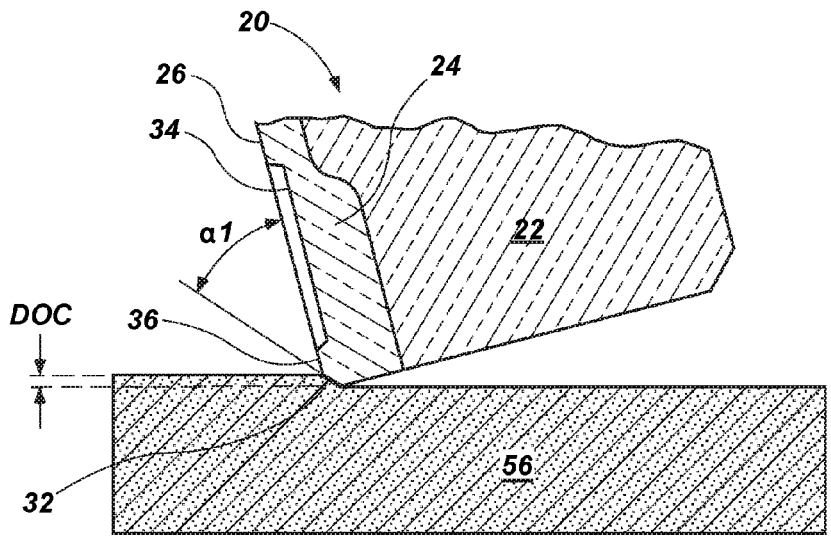
FIG. 27 is a cross-sectional view of a cutting element having a recessed surface in a cutting face of a superabrasive table interacting with a formation during drilling operations at a relatively low depth-of-cut, according to an embodiment of the present disclosure.

In operation at relatively small depths of cut, the uncut formation 56 may interact only with the chamfer surface 32 of the cutting element 20, as shown in FIG. 27. At greater depths of cut, the uncut formation 56 may interact with the planar surface 36 of the cutting face 26 of the cutting element 20, as shown in FIG. 28. In view of this, at relatively low depths of cut, wherein the uncut formation 56 interacts only with the chamfer surface 32 of the cutting element 20, the cutting element 20 may exhibit a relatively high effective backrake angle α1 (FIG. 27). At relatively high depths of cut, wherein the uncut formation 56 interacts with the planar surface 36 of the cutting face 26 of the cutting element 20, the cutting element 20 may exhibit a relatively low effective backrake angle α2 (FIG. 28).

Figure 29:
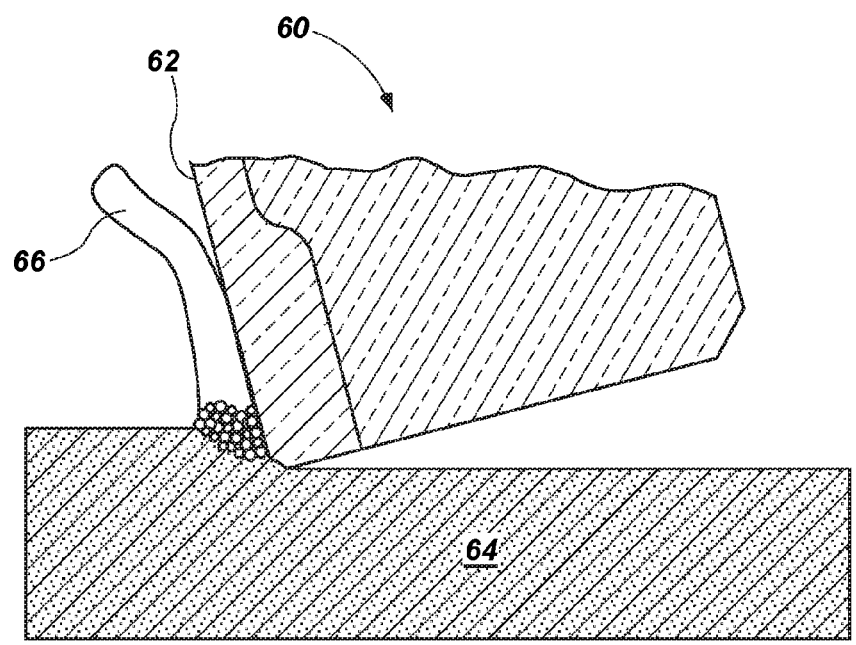
FIG. 29 is a cross-sectional view of a conventional cutting element without a recessed surface in a cutting face of a superabrasive table interacting with a formation during drilling operations and showing a chip formation.
Figure 30:
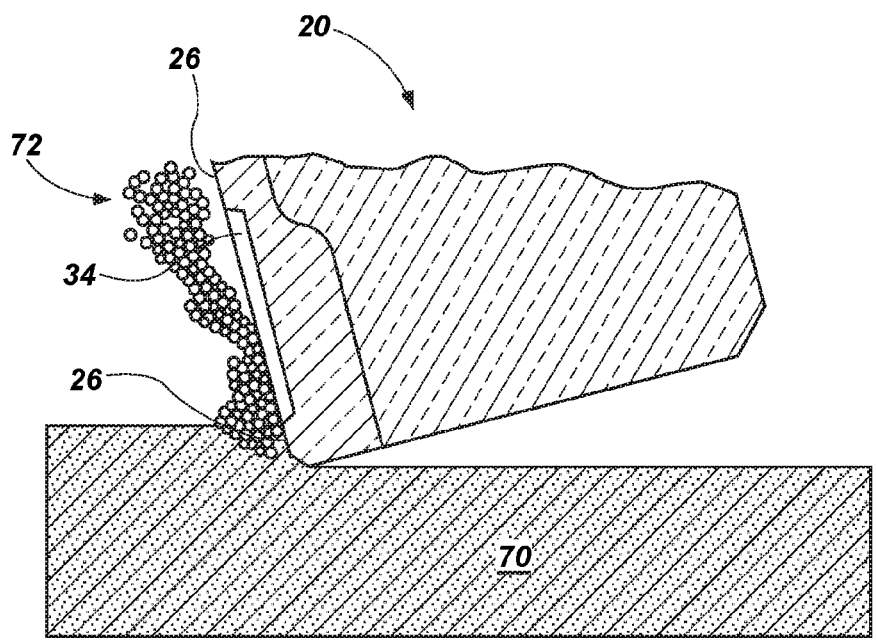
FIG. 30 is a cross-sectional view of a cutting element with a recessed surface in a cutting face of a superabrasive table interacting with a formation during drilling operations and showing a fractured formation in granular form, according to an embodiment of the present disclosure.

In view of the foregoing, at least one recessed surface 34 in the cutting face 26 of a cutting element 20 may be positioned and configured to inhibit or reduce the impaction of cuttings removed from a formation 56 from compacting together at the cutting face and forming cohesive structures (i.e., chips). As shown in FIG. 29, when a cutting element 60 with a substantially planar cutting face 62 is pushed through an uncut formation 64, the uncut formation 64 fractures and may then be substantially immediately compacted into the cutting face 62 of the cutting element 60, due to the forward movement of the cutting element 60 relative to the formation 64. In view of this, the pieces of fractured formation 64 that impact the cutting face 62 of the cutting element 60 may become compressed together, forming a cohesive structure 66 known generally in the art as a "chip." However, when a cutting element 20 having at least one recessed surface 34, as described herein, in the cutting face 26 positioned just radially inward of the cutting edge at a sufficient depth is pushed through an uncut formation 70, as shown in FIG. 30, granular pieces 72 of fractured formation 70 may be inhibited or prevented from impacting the cutting element 20 after fracturing. As a result, the granular pieces 72 of fractured formation 70 may not compress together sufficiently to form cohesive structures of any substantial size and may be carried away by drilling fluid as granular pieces 72 in discrete particulate form.

In light of this, the work required to penetrate a formation with an earth-boring tool comprising cutting elements 20 with at least one recessed surface 34 as described herein may be relatively low, as work that would ordinarily expended by cutting elements compressing a fractured formation to form chips may not be required. Furthermore, problems such as balling associated with cuttings or chips sticking to a bit face may be prevented or inhibited by utilizing cutting elements 20 with at least one recessed surface 34 as described herein, as the fractured formation in granular or particulate form may be readily carried away from a bit face by drilling fluid.

Figure 31:
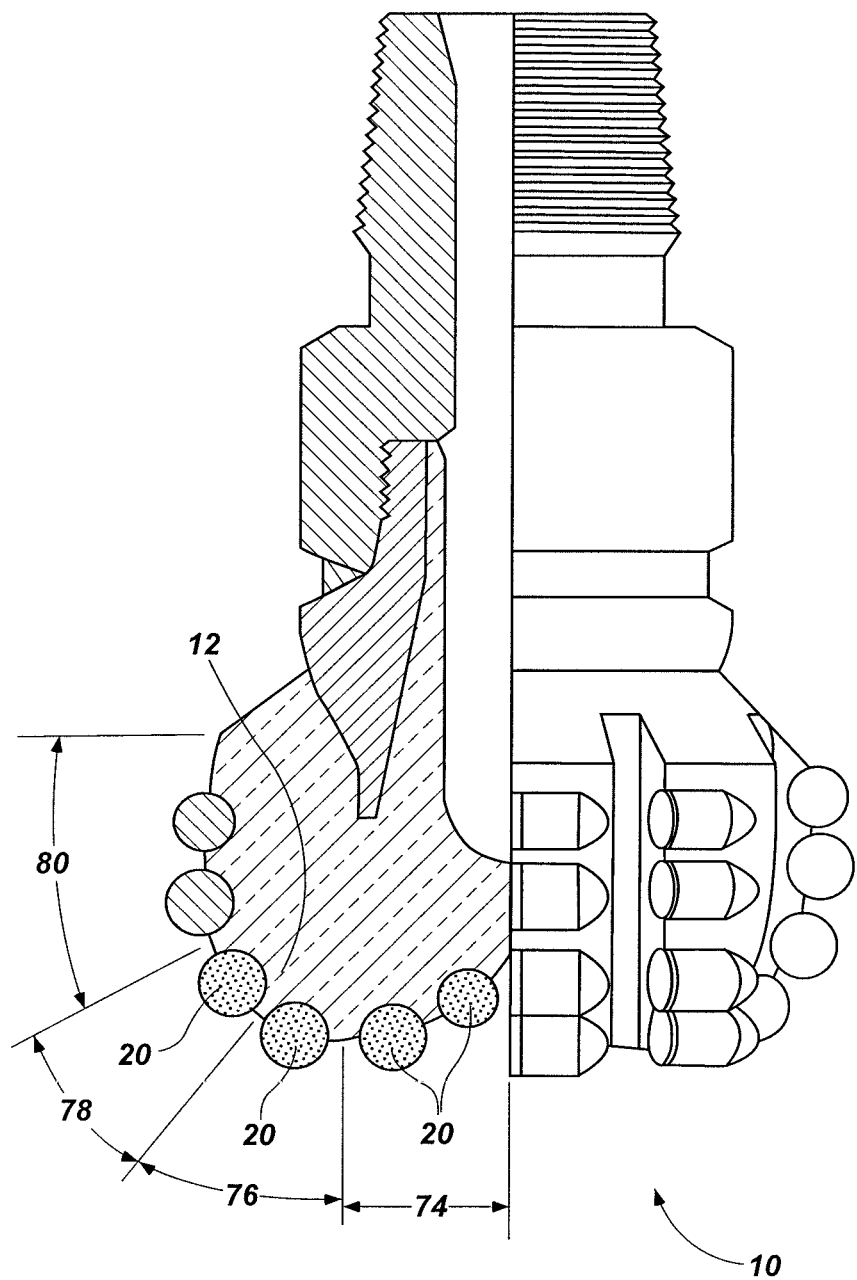
FIG. 31 is a partial cross-sectional side view of an earth-boring drill bit illustrating selective placement of a plurality of cutting elements, according to an embodiment of the present disclosure.

Performance factors, such as efficiency, aggressivity, and durability, of an earth-boring tool comprising cutting elements 20 with at least one recessed surface 34 as described herein may be tailored and balanced by strategic placement of such cutting elements 20 at on the tool. Cutting elements 20 configured with one or more recessed surfaces 34, as described herein, may exhibit more aggressive and efficient cutting performance relative to conventional PDC cutting elements, albeit at the expense of less durability compared to conventional PCS cutting elements. Thus, performance of the cutting elements 20 may be further tailored for specific subterranean formations, such as, by way of non-limiting examples, horizontal shales or shaly sands. When harder or more interbedded formations are to be encountered, the tool design might retain a larger selection of conventional PDC cutters in the high depth-of-cut regions of the tool, while using the cutting elements 20, as described herein, in the lower depth-of-cut regions. FIG. 31 is a simple partial cross-sectional view illustrating an embodiment of an earth-boring tool utilizing selective placement of the cutting elements 20 of the present disclosure. For illustrative purposes, the earth-boring tool of FIG. 31 is the fixed-cutter rotary drill bit 10 of FIG. 1, configured as previously described, although it is to be recognized that the selective placement embodiments disclosed herein may be incorporated on other earth-boring tools, such as reamers, hole-openers, casing bits, core bits, or other earth-boring tools.

As shown in FIG. 31, the drill bit 10 includes a plurality of cutting elements 20 mounted to each blade 12 of the drill bit 10. Moreover, as understood in the art, a profile of a drill bit 10, configured as shown in FIG. 31, may comprise a cone region 74, a nose region 76, a shoulder region 78, and a gage region 80. Cutting elements 20 located in the respective cone and nose regions 74, 76 of a blade 12 may be exposed to a greater depth-of-cut in formation material relative to cutting elements 20 located in other regions of the blade 12, but may be subjected to a lesser work rate than in other regions of the blade 12. Conversely, cutting elements 20 located in the shoulder region 78 of the blade 12 may be exposed to a higher work rate, but a lesser depth-of-cut, than cutting elements 20 in other regions of the blade 12. It is to be appreciated that cutting elements 20 having one or more recessed surfaces 34, as described previously, may be selectively located at specific regions of the blade 12 to optimize one or more desired performance characteristics. As shown in FIG. 31, cutting elements 20, as described herein, may be selectively located in the cone region 74 and the nose region 76, and may be configured with one or more recessed surfaces 34 tailored for specific high depth-of cut performance characteristics. Additionally, cutting elements 20, as described herein, may be selectively located in the shoulder region 78 of the blade 12, and may be configured with one or more recessed surfaces 34 tailored for specific high work rate performance characteristics. The gage region 80 of the blade 12 may be fitted with conventional PDC cutting elements. In additional embodiments (not shown), cutting elements 20 having one or more recessed surfaces 34, as described herein, may be selectively located in only one of the cone region 74, nose region 76, shoulder region 78, or gage region 80, while conventional PDC cutting elements may be located in the remaining regions. In yet other embodiments, cutting elements 20 having one or more recessed surfaces 34, as described herein, may be selectively located in any combination of the cone region 74, nose region 76, shoulder region 78, or gage region 80, with conventional PDC cutting elements located in the remaining regions of the blade 12.

Figure 32:
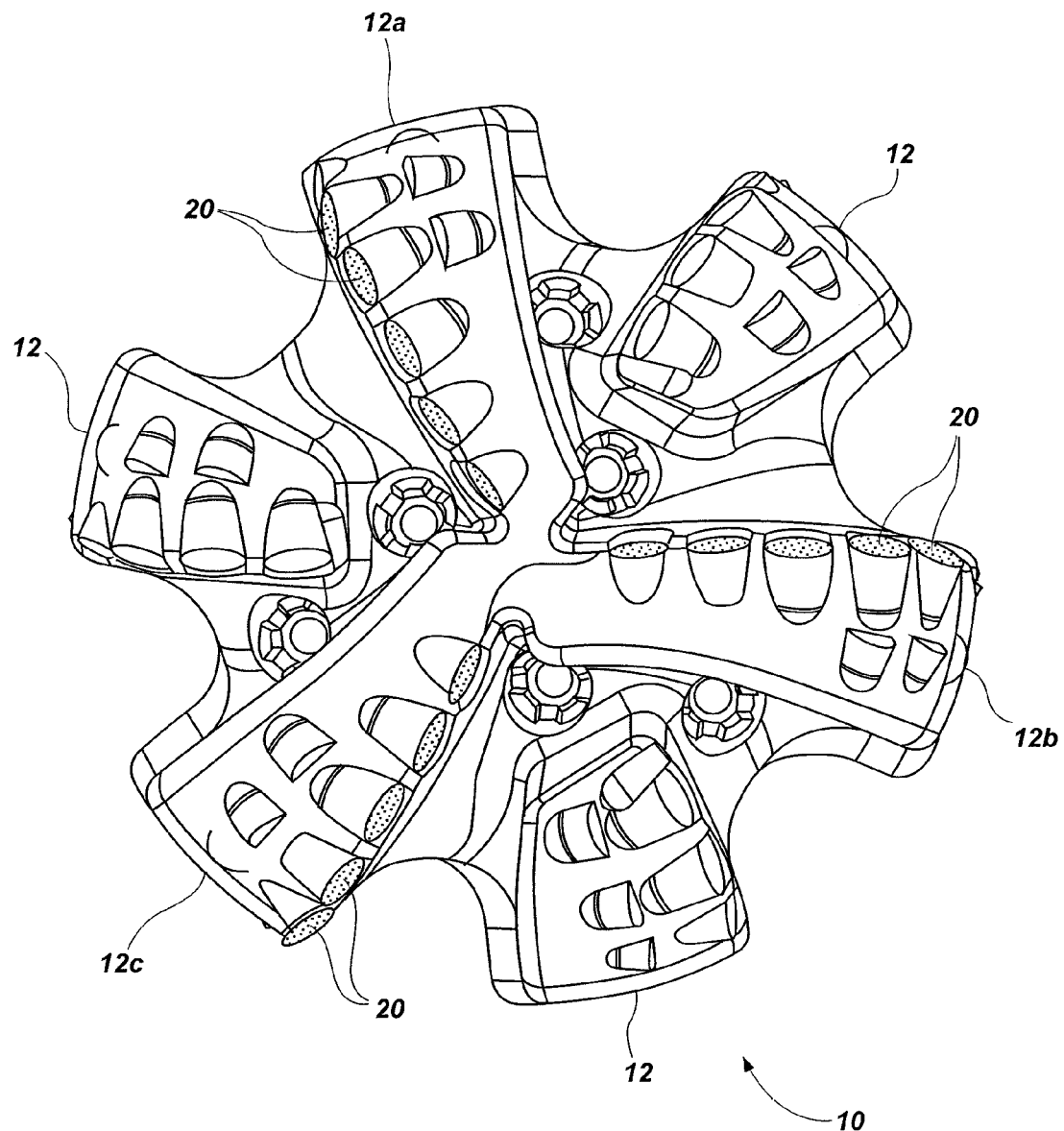
FIG. 32 is a bottom view of an earth-boring drill bit illustrating selective placement of a plurality of cutting elements, according to an embodiment of the present disclosure.

Additionally, referring to FIG. 32, cutting elements 20 having one or more recessed surfaces 34, as described herein, may be selectively located on one or more blades 12 of the drill bit 10. As shown in FIG. 32, a drill bit 10 may be configured with cutting elements 20, as described herein, on alternating blades 12a-12c of the drill bit 10, while the remaining blades 12 may be fitted with conventional PDC cutting elements. Benefits of such placement may include, among others, an optimal balance of the aggressivity, stability and steerablity of the drill bit 10. It is to be appreciated that in further embodiments, cutting elements, such as cutting elements 20 described herein, may be selectively placed on specific blades and on specific regions of each specific blade, as described previously, to further tailor performance characteristics of the drill bit 10.

Although the foregoing description contains many specifics, these are not to be construed as limiting the scope of the present disclosure, but merely as providing certain example embodiments. Similarly, other embodiments of the disclosure may be devised that are within the scope of the present disclosure. For example, features described herein with reference to one embodiment may also be combined with features of other embodiments described herein. The scope of the disclosure is, therefore, indicated and limited only by the appended claims and their legal equivalents, rather than by the foregoing description. All additions, deletions, and modifications to the disclosure, as disclosed herein, which fall within the meaning and scope of the claims, are encompassed by the present disclosure.

What is claimed is:

1. A cutting element for an earth-boring tool, comprising:
a superabrasive table positioned on a substrate, the superabrasive table defining a cutting face of the cutting element, the superabrasive table comprising:
at least a portion of a lateral side surface of the cutting element;
a substantially planar surface of the cutting face; and
at least one substantially planar annular recessed surface in the cutting face of the superabrasive table, the at least one substantially planar annular recessed surface having a radially outer edge and a radially inner edge, the substantially planar surface of the cutting face extending between the radially outer edge of the at least one substantially planar annular recessed surface and the lateral side surface of the cutting element, wherein a distance between the radially outer edge of the at least one substantially planar annular recessed surface and the lateral side surface of the cutting element is smaller than a distance between the radially outer edge and the radially inner edge of the at least one substantially planar annular recessed surface, and wherein the distance between the radially outer edge and the radially inner edge of the at least one substantially planar annular recessed surface is greater than a diameter of a circle defined by the radially inner edge of the at least one substantially planar annular recessed surface.

2. The cutting element of claim 1, wherein the at least one substantially planar recessed surface is positioned substantially parallel with the substantially planar surface of the cutting face of the cutting element.

3. The cutting element of claim 1, wherein the substantially planar surface of the cutting face has a surface roughness less than about 10 μin. RMS.

4. The cutting element of claim 3, wherein the substantially planar surface of the cutting face has a surface roughness less than about 0.5 μin. RMS.

5. An earth-boring tool, comprising:
at least one cutting element comprising:
a superabrasive table positioned on a substrate, the superabrasive table defining a cutting face of the at least one cutting element, the superabrasive table comprising:
at least a portion of a lateral side surface of the at least one cutting element;
a substantially planar surface of the cutting face; and
a substantially planar annular recessed surface in the cutting face of the superabrasive table, the substantially planar annular recessed surface having a radially outer edge and a radially inner edge, the substantially planar surface of the cutting face extending between the radially outer edge of the substantially planar annular recessed surface and the lateral side surface of the at least one cutting element,
wherein a distance between the radially outer edge of the substantially planar annular recessed surface and the lateral side surface of the at least one cutting element is smaller than a distance between the radially outer edge and the radially inner edge of the substantially planar annular recessed surface, and
wherein the distance between the radially outer edge and the radially inner edge of the substantially planar annular recessed surface is greater than a diameter of a circle defined by the radially inner edge of one substantially planar annular recessed surface; and
a shaped feature in the substrate at an interface between the superabrasive table and the substrate corresponding to the substantially planar annular recessed surface in the cutting face of the superabrasive table.

6. The earth-boring tool of claim 5, wherein the shaped feature in the substrate at the interface between the superabrasive table and the substrate comprises a recessed surface in the substrate having a shape similar to the shape of the substantially planar annular recessed surface in the cutting face of the superabrasive table.

7. The earth-boring tool of claim 5, wherein the substantially planar surface of the cutting face has a surface roughness less than about 10 μin. RMS.

8. The earth-boring tool of claim 7, wherein the substantially planar surface of the cutting face has a surface roughness less than about 2 μin. RMS.

9. The earth-boring tool of claim 8, wherein the substantially planar surface of the cutting face has a surface roughness less than about 0.5 μin. RMS.

10. An earth-boring tool, comprising:
at least one cutting element comprising:
a superabrasive table positioned on a substrate, the superabrasive table defining a cutting face of the at least one cutting element, the superabrasive table comprising:
at least a portion of a lateral side surface of the at least one cutting element;
a substantially planar surface of the cutting face; and
at least one substantially planar annular recessed surface in the cutting face of the superabrasive table, the at least one substantially planar annular recessed surface having a radially outer edge and a radially inner edge, the substantially planar surface of the cutting face extending between the radially outer edge of the at least one substantially planar annular recessed surface and the lateral side surface of the at least one cutting element,
wherein a distance between the radially outer edge of the at least one substantially planar annular recessed surface and the lateral side surface of the at least one cutting element is smaller than a distance between the radially outer edge and the radially inner edge of the at least one substantially planar annular recessed surface, and
wherein the distance between the radially outer edge and the radially inner edge of the at least one substantially planar annular recessed surface is greater than a diameter of a circle defined by the radially inner edge of the at least one substantially planar annular recessed surface.

11. The earth-boring tool of claim 10, further comprising:
a depth-of-cut limiting feature positioned on the earth-boring tool to inhibit interaction between uncut earth formation and the at least one substantially planar recessed surface in the cutting face of the superabrasive table during earth-boring operations.

* * * * *